(12) United States Patent
Wright et al.

(10) Patent No.: US 12,216,443 B2
(45) Date of Patent: Feb. 4, 2025

(54) SYSTEM AND METHOD FOR CONTROLLING A LATCHING RELAY FAILSAFE

(71) Applicant: Parker-Hannifin Corporation, Cleveland, OH (US)

(72) Inventors: Zachary R. Wright, Wildwood, MO (US); Ted W. Sunderland, Washington, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 422 days.

(21) Appl. No.: 17/788,078

(22) PCT Filed: Feb. 26, 2021

(86) PCT No.: PCT/US2021/019850
§ 371 (c)(1),
(2) Date: Jun. 22, 2022

(87) PCT Pub. No.: WO2021/173955
PCT Pub. Date: Sep. 2, 2021

(65) Prior Publication Data
US 2023/0048352 A1    Feb. 16, 2023

Related U.S. Application Data

(60) Provisional application No. 62/982,316, filed on Feb. 27, 2020.

(51) Int. Cl.
*G05B 19/042* (2006.01)
(52) U.S. Cl.
CPC ............ *G05B 19/0428* (2013.01); *G05B 2219/24125* (2013.01); *G05B 2219/24139* (2013.01); *G05B 2219/2614* (2013.01)

(58) Field of Classification Search
CPC ...... G05B 19/0428; G05B 2219/24125; G05B 2219/24139; G05B 2219/2614
See application file for complete search history.

(56) References Cited

U.S. PATENT DOCUMENTS 3,769,550 A    10/1973    Lee
4,387,442 A *   6/1983    Stuehler ............... G06F 11/00
                                                         711/2

(Continued)

FOREIGN PATENT DOCUMENTS

GB    2363271 A       12/2001
JP    H04167014 A     6/1992

(Continued)

OTHER PUBLICATIONS

International Search Report and Written Opinion of the International Searching Authority for corresponding International Patent Application No. PCT/US2021/019850, mailed May 14, 2021.

(Continued)

*Primary Examiner* — Ziaul Karim
(74) *Attorney, Agent, or Firm* — Renner, Otto, Boisselle & Sklar, LLP

(57) ABSTRACT

A control circuit includes a latching relay, a power loss activation circuit, and a watchdog circuit. A microcontrol unit (MCU) communicates with the watchdog circuit in a normal operation of the control circuit. As an action of a failsafe precaution in the event of a main power loss or a component failure, the MCU stops communicating with the watchdog circuit, at which point the watchdog circuit instructs the power loss activation circuit to continue operation of the control circuit. The control circuit further operates to implement mitigation operations in the event of a main power loss or component failure.

15 Claims, 8 Drawing Sheets

(56) References Cited

U.S. PATENT DOCUMENTS

| | | | | |
|---|---|---|---|---|
| 5,237,830 A | * | 8/1993 | Grant | F25D 21/006 |
| | | | | 62/155 |
| 5,430,600 A | | 7/1995 | Burns | |
| 5,628,199 A | * | 5/1997 | Hoglund | F25B 49/02 |
| | | | | 62/155 |
| 5,897,596 A | * | 4/1999 | Kabune | G05B 23/0291 |
| | | | | 714/E11.017 |
| 5,993,039 A | | 11/1999 | Crill | |
| 6,021,038 A | | 2/2000 | Hanchett, Jr. | |
| 9,076,616 B2 | | 7/2015 | Oebser | |
| 2017/0062163 A1 | | 3/2017 | Nishio | |

FOREIGN PATENT DOCUMENTS

| | | |
|---|---|---|
| JP | H08104221 A | 4/1996 |
| JP | 2002267528 A | 9/2002 |
| JP | 2005037036 A | 2/2005 |

OTHER PUBLICATIONS

Second Written Opinion of the International Preliminary Examining Authority for corresponding International Patent Application No. PCT/US2021/019850, mailed Jan. 17, 2022.

International Preliminary Report on Patentability of the International Preliminary Examining Authority for corresponding International Patent Application No. PCT/US2021/019850, mailed May 16, 2022.

Chuthong Summatta, et al., "Design and simulation of relay drive circuit for safe operation order," AIP Conference Proceedings 1775, 030031 (2016), https://aip.scitation.org/doi/abs/10.1063/1.4965151?journalCode=apc.

International Standard, "Refrigerating systems and heat pumps—Safety and environmental requirements—Part 1: Definitions, classification and selection criteria," ISO 5149-1:2014(E), First Edition, Apr. 15, 2014.

* cited by examiner

SYSTEM AND METHOD FOR CONTROLLING A LATCHING RELAY FAILSAFE

This application is a national phase of International Application No. PCT/US2021/019850 filed Feb. 26, 2021, which claims priority to U.S. Application No. 62/982,316 filed Feb. 27, 2020, each of which is hereby incorporated herein by reference in its entirety.

FIELD OF INVENTION

This application relates generally to systems and methods for controlling relay failsafe on power loss or fault, and more particularly to systems and methods for power loss or fault detection and failsafe operation in safety control devices for flammable and/or toxic refrigerant systems.

BACKGROUND

A relay may be subjected to a variety of ambient conditions during actual use resulting in unexpected failure. The use of flammable and/or toxic refrigerants in heating and cooling systems requires the use of failsafe mechanisms to prevent accidental build-up of refrigerant, particularly if the system is in an enclosed area. Refrigerant systems may use relays to operate failsafe systems that ensure concentration levels of refrigerants remain below specified limits. In some applications, these failsafe systems may preferably have an expected product life of over twenty years to be commensurate with the life of the system in which they operate, but existing failsafe systems can go through years of non-use and may become unreliable.

For example, refrigerant concentration may be monitored by sensors to maintain concentrations below a flammability level. Typically, should concentrations build to a hazardous level, mitigation operations must be performed. Mitigation operations may include, for example, stopping the compressor, opening dampers, and/or turning on a fan to disperse refrigerant gas. Such mitigation operations need to be performed under any fault conditions and in situations involving main power loss, such as when a main power supply falls below a predetermined threshold. As referenced above, refrigerant systems may use relays to operate failsafe systems so that any necessary mitigation operations can be performed, but there remains a need for further contributions in this area of technology to ensure reliable relay operation to perform the mitigation operations.

SUMMARY OF INVENTION

The application relates to providing more reliable relay operation in failsafe conditions. Aspects of the current application include a control circuit with a latching relay coupled to a normal operation circuit and a relay status monitoring circuit, a reset coil monitoring circuit, a set coil monitoring circuit, fan control circuitry, a power loss activation circuit, compressor control circuitry, and a watchdog circuit. The novel application of latching relays, power loss detection, and failsafe operation may be employed to enable emergency mitigating action initiation. Emergency mitigating actions include maintaining the relay in a set position, maintaining the relay in a reset position, or causing the relay to switch positions.

The systems and methods described herein provide for normal controlled operation and emergency mitigating action initiation during power loss and component failure situations. For example, the system may maintain the relay in the reset position on power loss or component fault to implement operation of a failsafe system, such as an exhaust fan. In another example, the system may maintain the relay in the set position on power loss or component fault to prevent undesirable operation of a system component, such as a compressor. Additionally, the system may cause operation of the relay to switch positions on and/or off after power loss or component fault to enable initiation of other types of emergency mitigating actions as may be warranted in particular circumstances.

A control circuit operates to control operative components in parallel with power and fault detection. Under a normal operation, a microcontrol unit (MCU) operates to constantly reinforce a state of a latching relay of the control circuit by supplying a signal of a given period and pulse width. The MCU further inputs a periodic signal to the watchdog circuit that also is electrically connected to the control circuit. When the MCU ceases inputting the periodic signal to the watchdog circuit, indicating a potential MCU fault condition, the watchdog circuit switches the latching relay into a failsafe position to initiate mitigation operations. The mitigation operations also may be powered by a power loss activation circuit that provides alternative power in the event of a power loss. In an example of a refrigerant system, mitigation operations may include stopping compressor operation and turning on a fan to disperse leaked refrigerant that can build up to hazardous concentrations during a power loss.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

The following detailed description and appended drawings describe and illustrate various exemplary embodiments of the invention. The description and drawings serve to enable one skilled in the art to make and use the invention, and are not intended to limit the scope of the invention in any manner. With respect to the methods disclosed, the steps presented are exemplary in nature, and thus, the order of the steps is not necessary or critical.

Figure 1:
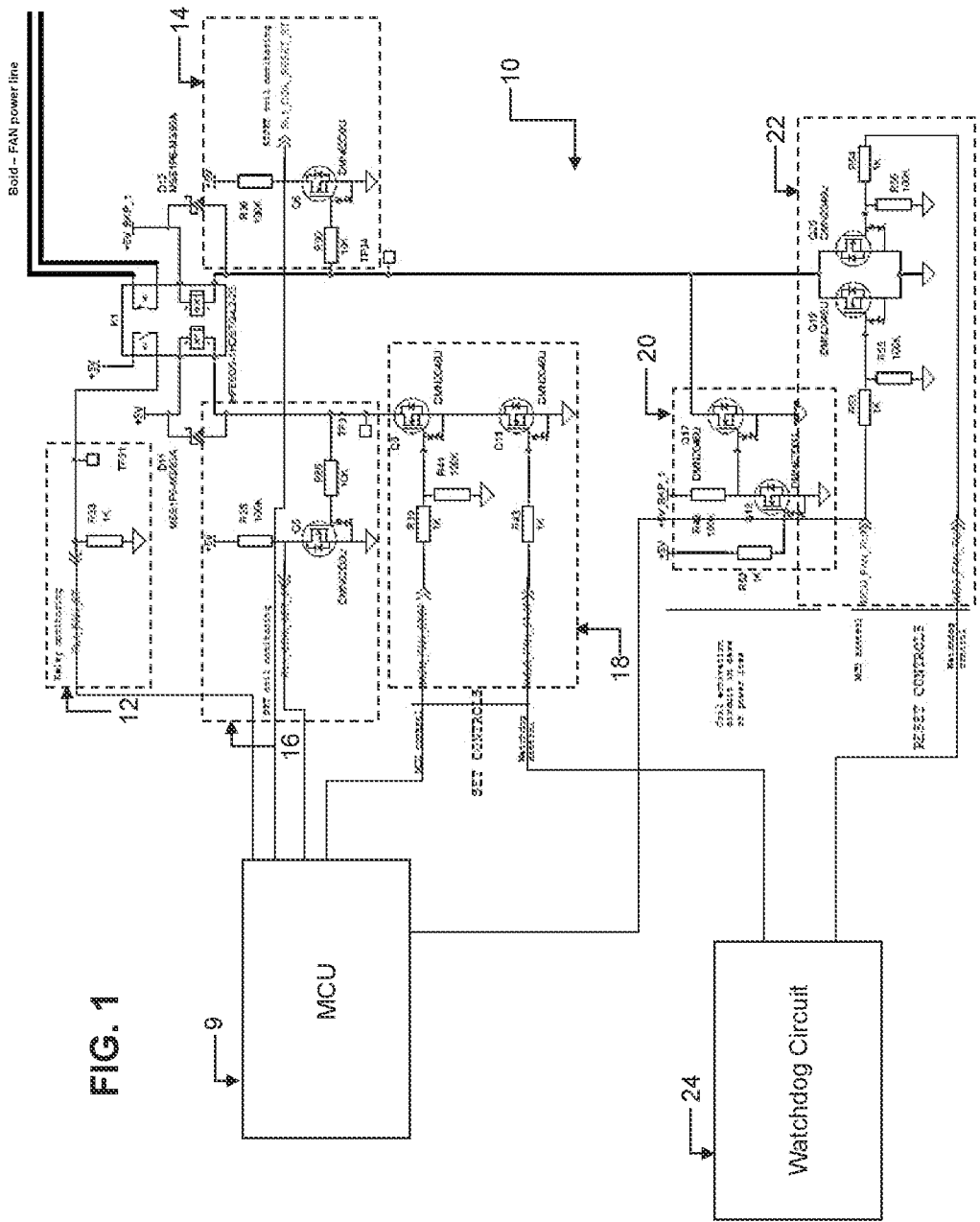
FIG. 1 depicts an electrical control circuit schematically illustrating a configuration for a latching relay failsafe which implements a fan control according to an embodiment.

Referring to FIG. 1, embodiments of the current application relate to a control circuit 10 suitable for implementing mitigative failsafe operational methods and actions in the event of a power loss, such as when a main power supply falls below a predetermined threshold, or failure of a microcontrol unit (MCU) 9 to provide refresh pulses to a watchdog circuit 24 using a relay. The control circuit 10 may be incorporated into a single package to provide single fault tolerant mitigating actions for electrical systems. The control circuit 10 may be utilized to provide required single fault tolerant mitigating actions as defined in various safety standards, such as UL 60335-2-40 Annex GG for Electrical Heat Pumps, Air-Conditioners and Dehumidifiers, or others. For heating, ventilation, and air conditioning (HVAC) systems, the control circuit 10 may be configured to cause a desired mitigating action that would occur in a power loss or component fault event of the HVAC system. In consideration of this, the mitigating action depends on a system to which the control circuit 10 is coupled. This requires relays to actuate with regards to either a set (e.g., MCU 9 controlled) or reset (e.g., failsafe) state when the system detects that any fault has occurred, including power loss to the system such as when a main power supply falls below a predetermined threshold or a component fault, otherwise referred to as a failsafe mechanism. Non-latching relays may not remain powered for the duration required for the product life, so latching relays may be used. It is possible for latching relays to change state by external forces (vibration, magnetic pull, etc.). The control circuit 10 may include one or more circuit elements to automatically detect and correct erroneous relay states. Additionally, the periodic pulse control from the MCU 9 supplies a continuous reinforcement of the intended state to the latching relay(s).

Figure 2:
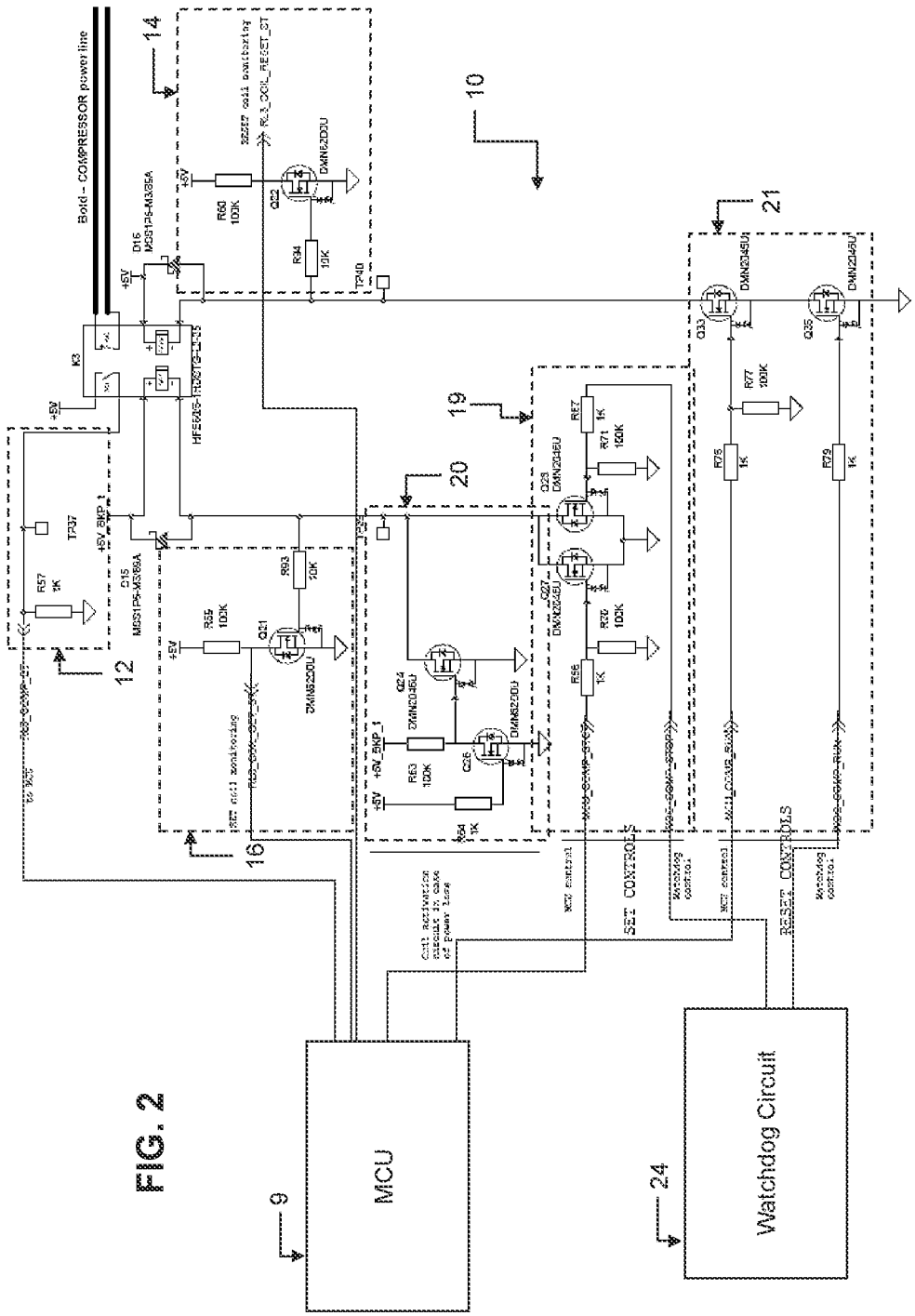
FIG. 2 depicts an electrical control circuit schematically illustrating a configuration for a latching relay failsafe which implements a compressor control according to an embodiment.

An embodiment of the present application includes the control circuit 10 that is generally comprised of a number of circuit components, such as a relay contact status monitoring circuit 12, a RESET coil monitoring circuit 14 (or a first monitoring circuit), a SET coil monitoring circuit 16 (or a second monitoring circuit), a fan operation circuit 18, a power loss activation circuit 20, a fan override circuit 22, and a watchdog activation circuit 24, wherein circuits 20 and 22 in combination act as MCU control and watchdog override. Comparable compressor control circuitry similarly may be provided as is illustrated in FIG. 2, whereby the compressor is deactivated for the failsafe state while the fan is activated for the failsafe state. The control circuit 10 shown in FIG. 2, specifically, is generally comprised of comparable components, such as the relay contact status monitoring circuit 12, the RESET coil monitoring circuit 14, the SET coil monitoring circuit 16, the power loss activation circuit 20, a compressor deactivation circuit 19, and a compressor activation control circuit 21, wherein circuits 19 and 21 in combination act as MCU control and watchdog override. As shown in FIGS. 1 and 2, each of the components of the control circuit 10 are electrically connected to each other forming the control circuit 10.

In general, the control circuit 10 operates to provide the MCU 9 with control of the operative components of the system (e.g., fan, compressor) in parallel with power detection, whereby a mitigative device (not shown), such as a fan, is forced to the active mitigation state in the event of a power loss or component fault, and maintained under MCU 9 control during normal (powered) operation. Under normal operation, the MCU 9 operates to constantly reinforce a selected state of a latching relay K1 and/or K3 of the control circuit 10 by inputting a signal of a given period and pulse width to the appropriate coil of the latching relay K1 and/or K3. The MCU 9 further inputs a periodic signal to the watchdog circuit 24 that also is electrically connected to the control circuit 10. When the MCU 9 ceases inputting the periodic signal to the watchdog circuit 24, indicating a fault condition of the MCU, the watchdog circuit 24 switches the latching relay K1 and/or K3 into a failsafe position to initiate mitigation operations. In an example of a refrigerant system, mitigation operations may utilize the operation of the fan/compressor control circuitry to stop compressor operation and turn on a fan to disperse refrigerant that can build up to hazardous concentrations in the event of a refrigerant leak. Specifically, in the event of an MCU failure a compressor function stops running and a fan function starts to run instead to disperse refrigerant gas.

Figure 3:
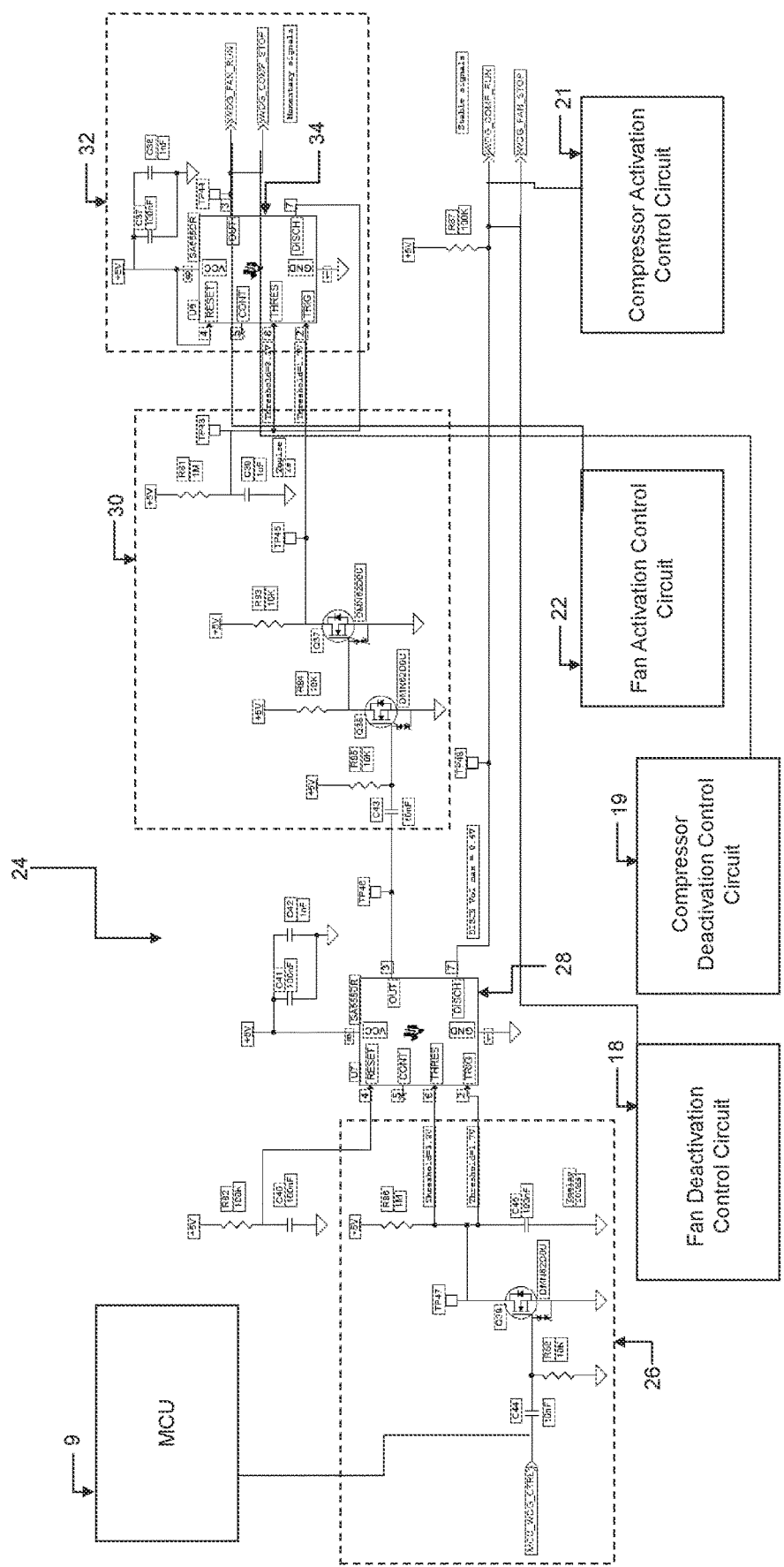
FIG. 3 depicts an electrical control circuit schematically illustrating a configuration for a watchdog circuit.

Under normal operation, the control circuit 10 receives power from an external power source, such as a +5V power supply. The latching relay K1 and/or K3 is maintained in the MCU controlled state. FIGS. 1 and 2 illustrate inputs to the control circuit 10 from the MCU 9 and the watchdog circuit 24 (which is depicted in FIG. 3). The MCU 9 may be configured as any suitable electronic processing device, including one or more of a logic circuit, CPU, firmware, hardware circuit, memory device storing executable program code, and other forms of electronic controller as is known in the art. The MCU 9 outputs a periodic refresh signal to the watchdog circuit 24 concurrently with the normal operation of the control circuit 10. In the event of component or circuit failure, the MCU 9 stops outputting the periodic refresh signal to the watchdog circuit 24. The latching relay K1 and/or K3 is then placed in the failsafe state by a pulse sent from the watchdog circuit until normal operation of the control circuit 10 is resumed. To that end, the control circuit 10 includes SET controls (a first portion) and RESET controls (a second portion). Both SET controls and the RESET controls are coupled to the latching relays K1 and K3. In FIGS. 1 and 2, the latching relays K1 and K3 are two-coil latching relays with an input/common terminal, a first terminal associated with a SET state/position, and a second terminal associated with a RESET state/position. During normal operation, the latching relays' K1 and K3 associated control circuit 10 is powered from a power supply, while in the event of a power loss, the latching relays K1 and/or K3 are powered from a backup power source, such as a capacitor, through the power loss activation circuit 20.

The control circuit 10 may include one or more terminals configured to send status signals from the latching relays K1 and K3 to the MCU 9. The status signals may be received from the latching relays K1 and/or K3 via the RESET coil monitoring circuit 14, the SET coil monitoring circuit 16, or the relay contact status monitoring circuit 12.

For the control circuit 10 shown in FIGS. 1 and 2, failsafe operation is assumed when the latching relay K1 is in the RESET state and latching relay K3 is in the SET state. In this embodiment, the MCU 9 monitors and assesses the operation of the latching relay K1 and K3 and the components of the control circuit 10. Specific (non-limiting) examples of signals sent to the MCU 9 so that the MCU 9 may monitor and assess the operation of the control circuit 10 are shown in FIGS. 1 and 2. For example, RL1_FAN_ST is a signal from the relay status monitoring circuit 12 that permits the MCU 9 to assess whether the latching relay K1 has switched its position, or if the fan has been activated. RL1_COIL_SET_ST/RL1_COIL_RESET_ST are two individual signals from the SET coil monitoring circuit 16 and the RESET coil monitoring circuit 14, respectively, that permit the MCU 9 to monitor any control signals being sent to the latching relay K1 and that there is no failure in the control circuit or its componentry. Further RL1_FAN_ST in FIG. 1 and RL3_COMP_ST in FIG. 2 provide signals which allow the MCU 9 to assess whether the latching relay K1 and the latching relay K3, respectively, have their contacts in a desired state. In this instance, the MCU 9 alerts an external system (not shown) of the potential failure of the control circuit 10. The MCU 9 also supplies a periodic refresh signal that refreshes the watchdog circuit 24 of FIG. 3, in a pulsating manner if the MCU 9 is performing under normal operation.

Figure 5:
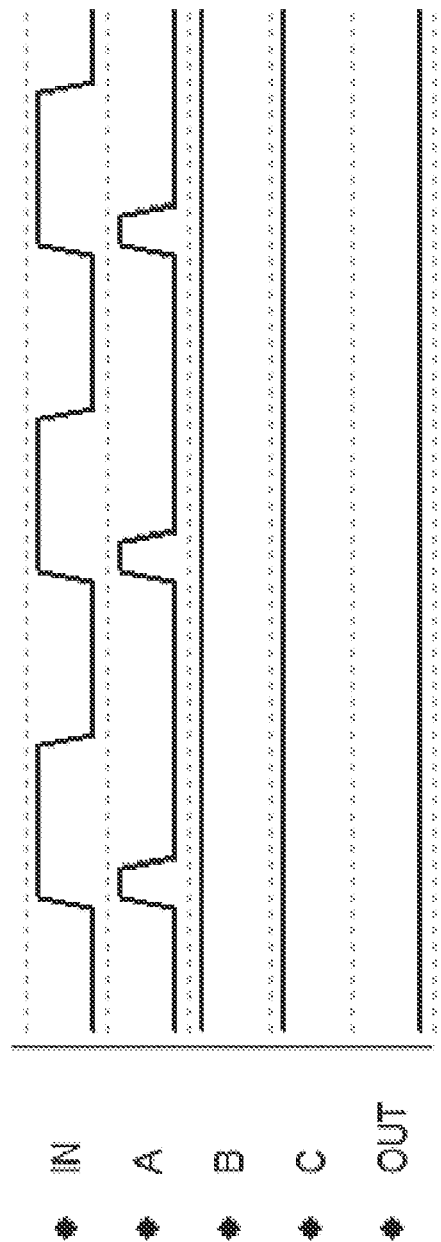
FIG. 5 is a graphical depiction of an operation of the watchdog circuit depicting an instance wherein a microcontrol unit (MCU) supplies a periodic refresh signal that refreshes the watchdog circuit.

FIG. 5 illustrates the interaction of the MCU 9 with the watchdog circuit 24, wherein the periodic refresh signal supplied from the MCU 9 is represented by an IN portion of FIG. 5 and the watchdog circuit 24 rising edge detection is represented by a portion of FIG. 5. As is further shown in FIG. 5, there is no output pulse to the latching relay control transistors Q11 and Q20 of FIG. 1, respectively, which is represented by an OUT portion of FIG. 5. This is because the watchdog circuit 24 has not been activated, which means the MCU 9 is operating normally and in the non-failsafe state. Additionally, the watchdog circuit 24 output B is seen as a constant high value. This is because B is electrically connected to WDG_COMP_RUN and WDG_FAN_STOP in a way that a high level enables full MCU 9 control of the non-failsafe coils of the relays.

Referring back specifically to FIGS. 1 and 2, under normal operation of the exemplary control circuit 10, a gate terminal Q5 is a P-Channel FET in the instance wherein the latching relay K1 and/or K3 is in a SET state/position. When the latching relay K1 and/or K3 is in a SET state/position, gate terminals Q9 and Q10 provide a path to a ground, to place the latching relay K1 and/or K3 under control of the MCU 9 or the watchdog circuit 24. This would then turn off the gate terminal Q5 through a resistor R80 and send a high signal to the MCU 9, indicating that the latching relay K1 and/or K3 SET coil is receiving control pulses. A diode D11 is a fly-back diode, utilized to shunt over-voltage spikes transmitted back to the power supply.

Figure 6:
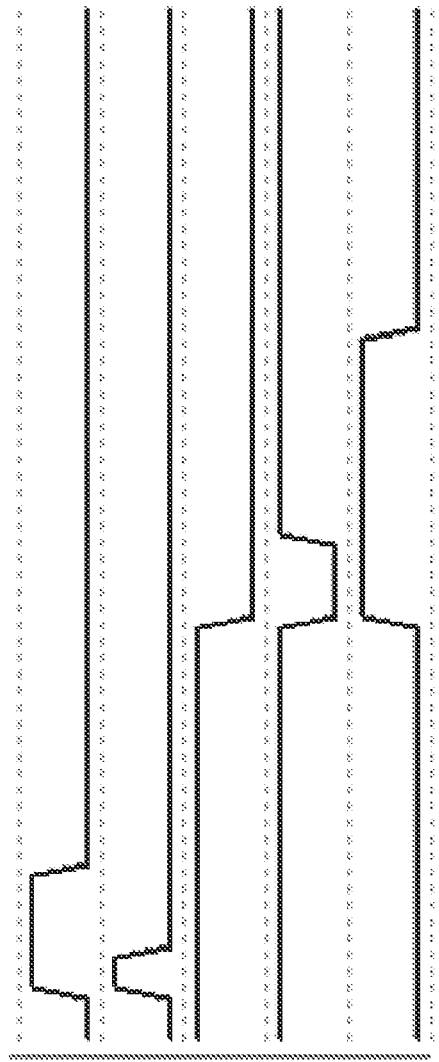
FIG. 6 is a graphical depiction of the operation of the watchdog circuit depicting an instance wherein the MCU stops supplying a periodic refresh signal for refreshing the watchdog circuit.

FIG. 6 illustrates the modification of the circuit operation as compared to FIG. 5, with FIG. 6 illustrating failsafe operation such as may occur during a component or circuit failure that interrupts MCU 9 operation. For the control circuit 10 shown in FIGS. 1 and 2, a mitigating action is assumed to be active when the latching relay K1 is in the RESET state/position and latching relay K3 is in the SET state/position. In this embodiment, a failsafe operation portion of the control circuit 10 is configured to energize the latching relay K1 to be positioned in the failsafe position when the MCU 9 stops refreshing the watchdog circuit 24 of FIG. 3. As shown in FIG. 6, which illustrates the interaction of the MCU 9 with the watchdog circuit 24 in failsafe operation, the MCU 9 again is represented by the IN portion of FIG. 6. In comparing the failsafe operation shown in FIG. 6 to the normal operation shown in FIG. 5, there is a value in the OUT portion of FIG. 6 that activates once the IN portion stops transmitting/receiving information, which is indicative of the activation of the watchdog circuit 24 to initiate mitigation operations.

Figure 4:
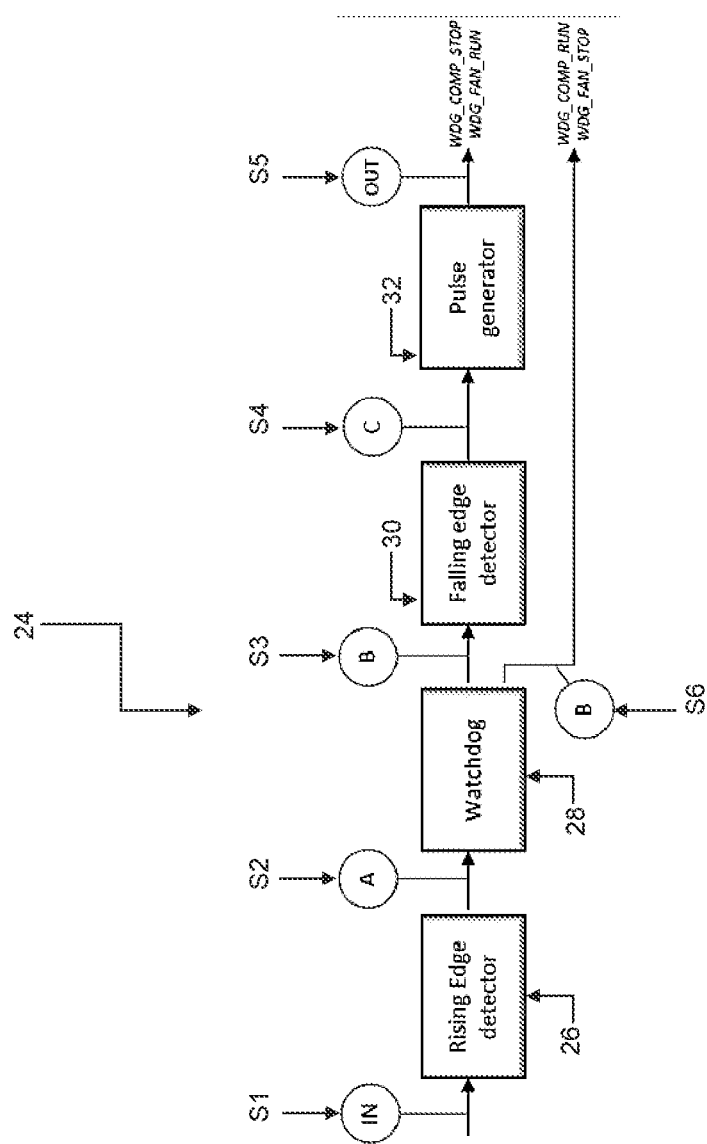
FIG. 4 depicts a block diagram of the watchdog circuit according to the embodiment of FIG. 3.

FIG. 3 depicts the electrical control circuit schematically illustrating a configuration for a watchdog circuit 24, and FIG. 4 depicts a block diagram of the watchdog circuit that may be employed in the circuitry of FIG. 3. As depicted in FIGS. 3 and 4, the watchdog circuit 24 is generally comprised of a rising edge detector 26, a watchdog 28, a falling edge detector 30 and a pulse generator 32. FIG. 4 illustrates the general flow of information communicated through the watchdog circuit 24, wherein an input is received by the rising edge detector 26 in S1. The rising edge detector outputs a positive pulse (rising then falling edge) for each rising edge detected (S1) to the watchdog circuit in S2. The watchdog then outputs a level high signal while pulses from S2 are detected or level low signal a short time after pulses from S2 stop.

The output of the watchdog 28 is sent to the falling edge detector 30 in S3, which outputs a negative pulse (falling then rising edge) when a negative edge input is detected. The falling edge detector 30 sends its output to the pulse generator 32 in S4. The pulse generator 32 outputs a positive pulse when a negative pulse is detected from S4 or a level low signal otherwise. The watchdog circuit 24 is connected to the control circuit 10 so that the output of the pulse generator 32 is outputted to the control circuit 10 in S5. The duration of the pulse output from S5 is selected to be within the minimum and maximum pulse time required to operate the coils of the latching relays K1 and/or K3. Additionally, the outputs of the watchdog 28 (S3 and S6) S6 are electrically outputted so that S6 has the same characteristics as described for S3. S6 is output to the control circuit 10 as an enable/disable signal to the MCU 9 controlled side of the relay control. Level high (normal operation) in S6 activates an N-channel MOSFET in the control circuit 10 that passes the MCU 9 controlled signals to put the latching relay K1 and/or K3 in its MCU controlled state. Level low (watchdog circuit 24 detected fault) in S6 deactivates the N-channel MOSFET and blocks the MCU 9 control and thereby prevents MCU 9 override of the watchdog circuit 24 controlled relay actuation (MCU 9 control for putting the latching relay K1 and/or K3 into its failsafe state is not disabled because it is the same control the watchdog circuit 24 is attempting to execute and would not interfere). The S5 output of the watchdog circuit 24 is connected to the N-channel MOSFET of the control circuit 10 such that a positive pulse from S5 generates an equivalent length current pulse through the failsafe coil of the latching relay K1 and/or K3 to either reinforce or actuate the latching relay K1 and/or K3 to the failsafe state and thereby trigger the failsafe function. Such function may include mitigation operations such as referenced above, for example stopping the compressor and turning on the fan for dispersing of a refrigerant. Normal operation may include, for example, allowing the running of the compressor and fan under control of the external HVAC system.

In operation of the watchdog circuit 24 as depicted in FIG. 3, the rising edge detector 26 sends a high-pulse through a capacitor C44 to a gate terminal of an N-Channel FET Q39 when a rising edge occurs on signal MCU_WDG_CTRL. This signal is inverted and passed through FET Q39 to maintain the watchdog circuit 24 in a timing mode. In the event the MCU 9 stops communicating with the watchdog circuit 24, a capacitor C45 is charged through a resistor R86.

The watchdog 28 performs a timer function, and thus also is referred to as a timer 28. The timer 28 receives an input from the rising edge detector 26 in timed intervals. In the case when a TRIG input is below 1.7V, the timer 28 outputs (OUT and DISCH) are maintained in a high status value. The THRES input of the timer 28 detects if the voltage is valued above 3.3V, in which case the outputs (OUT and DISCH) are pulled down to 0. The falling edge detector 30 detects when the outputs (OUT and DISCH) are getting low, in which case the falling edge detector sends a negative pulse to the pulse generator 32. The pulse generator 32 is formed from a second timer 34. Each time the TRIP input of the second timer 34 is pulled below 1.7V, outputs are set to 1 and an open collector output DISCH is opened. In this case, the component output OUT is set to 1 and a capacitor 39 begins to charge through a resistor 81. Otherwise, the component output OUT stays in a high state until the voltage across the capacitor 39 reaches the TRIG threshold, at which point the output OUT is reset.

The control circuit 10 in configured to perform a failsafe operation, wherein the MCU 9 stops sending a signal to the watchdog circuit 24 as described above. In this instance, the watchdog circuit 24 forces the unit to a failsafe state because the lack of refresh signals from the MCU 9 to the watchdog circuit 24 implies the MCU is not instructing the control circuit 10 any longer. In this case, the fan is activated and the compressor ceases operation. When the watchdog circuit 24 stops receiving the signal from the MCU 9, the watchdog circuit 24 places the control circuit 10 in a failsafe mode so that the latching relay K1 is in the RESET state/position and the latching relay K3 is in the SET state/position corresponding to the fan-on/compressor-off control.

Referring back to FIGS. 1 and 2, the power loss activation circuit 20 has two N-Channel FETs that are used to allow current through the failsafe coil of the latching relay K1 and/or K3 in the event where power is lost. When +5V is present, Q18 is ON and Q17 is OFF. In this instance the RESET coil is controlled by the MCU 9 or the watchdog circuit 24. However, when the power supply goes below 0.5V, Q17 is ON and Q18 is OFF, and the backup power supply +5V_BKP_1 is utilized so that the RESET coil may be energized to proceed with failsafe operations. In the present application, +5VBKP_1 may be is stored in a capacitor. The result is a resistor-capacitor (RC) circuit where the significant capacitive source is +5VBKP_1 and the significant resistive source is the relay coil. The capacitance on +5V_BKP_1 is sized such that the time the voltage is above the minimal coil operation threshold is within the minimum and maximum required pulse time for the relay coil. With such an appropriately scaled RC circuit, the discharge of the capacitor will act as the pulse to the relay coil.

Under normal operation of the exemplary control circuit 10, a gate terminal Q6 is a P-Channel FET when the latching relay K1 and/or K3 is in a RESET state/position. When the latching relay K1 and/or K3 is in a RESET state/position, gate terminals Q19 and Q20 provide a path to a ground, to place the latching relay K1 and/or K3 under control of the MCU 9 or the watchdog circuit 24. This would then turn off the gate terminal Q6 through a resistor R90 and send a high signal to the MCU 9, indicating that the latching relay K1 and/or K3 RESET coil is receiving control pulses. A diode D12 is a fly-back diode, utilized to shunt over-voltage spikes transmitted back to the power supply.

Figure 7:
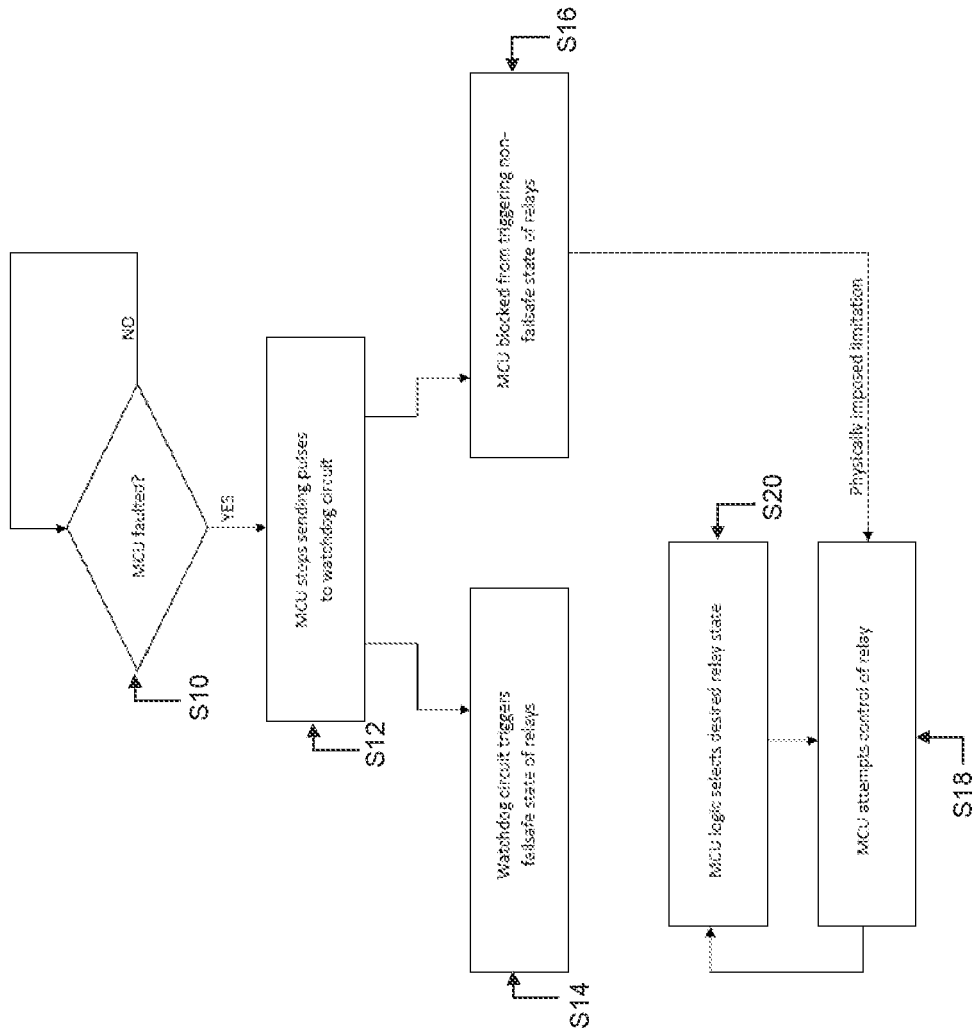
FIG. 7 depicts a flowchart illustrating an example of an operation of the watchdog circuit.

FIG. 7 is a flowchart illustrating an example of an operation of the watchdog circuit 24. As is depicted in the flowchart of FIG. 7, the watchdog circuit 24 is illustrated as being driven by the MCU 9. If the MCU is normally operating (NO in S10), a signal returns to the MCU 9. In the instance when the MCU detects a fault (YES in S10), the MCU 9 stops sending pulses to the watchdog circuit 24 in S12. The watchdog circuit 24 triggers a failsafe state of the latching relays K1 and/or K3 in S14. Simultaneously, the MCU 9 is blocked from triggering a non-failsafe state of the latching relays K1 and/or K3 in S16. Due to a physically imposed limitation, the MCU 9 then attempts control of the latching relay K1 and/or K3 in S18. The MCU 9 logic selects a desired latching relay K1 and/or K3 state (failsafe/non-failsafe) in S20, and the desired state remains implemented in the latching relays in accordance with whether the MCU is in a fault state.

Figure 8:
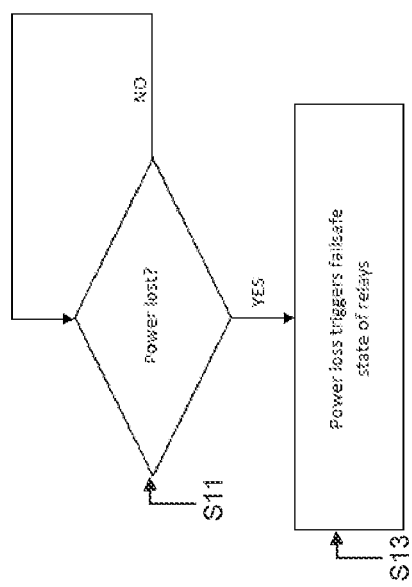
FIG. 8 depicts a flowchart illustrating an example of an operation of the control circuit in the event of a power loss.

FIG. 8 depicts a flowchart illustrating the instance when the control circuit 10 experiences a power loss, such as when a main power supply falls below a predetermined threshold. If the power detected is appropriate for normal operation of the control circuit 10 (NO in S11), a signal returns to continue to monitor the power supply. When power is lost (YES in S11), the power loss triggers a failsafe state of the latching relays in S13, and the failsafe state is implemented to account for such power loss with backup power to implement the failsafe state being provided by the power loss activation circuit.

Extreme or unexpected environmental events can result in the latching relay K1 being switched to an undesired state. The configuration of the control circuit 10 prevents these events from adversely affecting operation with the assertion of periodic redundant signals being presented to the SET coil controls and RESET controls. Previous systems used latching relay driving circuits that require the latching relay coils to be under control of MCU or comparable, or a power loss detector using control signals alternating between SET and RESET coil activation, preventing this relay state reinforcement feature. In addition, the inclusion of a failsafe operation portion including the watchdog circuit 24 enables the control circuit 10 to ensure failsafe operation during occurrence of a component or circuit fault. Employing latching relays ensures this device has a product life commensurate with the systems in which it is installed, e.g., 20-plus years for an HVAC system.

Although some embodiments have been discussed in terms of a relay, or particularly, a latching relay, the term relay should be understood such that a relay can include any number of solid state and/or electromechanical switches that are configured to make contacts, break contacts, and/or a combination thereof. Thus, the term relay is not intended to denote a single latching relay, but to encompass electrically operated switches configured to perform the desired actions described herein. One of ordinary skill in the art would recognize many variations, modifications, and alternatives. In addition, the precise circuit configurations of FIGS. 1-3 for the control circuit 10 and the watchdog circuit 24 are exemplary, and variations may be employed that are encompassed with the operations described herein.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A control circuit, comprising:
a relay including at least a first coil terminal and a second coil terminal;
a first monitoring circuit having a first node coupled to a power supply input configured to activate the first coil terminal in the event of a power loss;
a microcontrol unit (MCU), wherein, under a normal operation, the MCU operates to constantly reinforce a state of the relay;
a watchdog circuit communicative with the MCU, wherein the watchdog circuit is configured to activate the first coil terminal in the event that the MCU stops communication with the watchdog circuit; and
a power loss activation circuit that is electrically connected to the first monitoring circuit to provide backup power during a power loss;
wherein the watchdog circuit comprises of a rising edge detector, a watchdog timer, a falling edge detector, and a pulse generator.

2. The control circuit of claim 1, wherein a fan activation circuit is electrically connected to the power loss activation circuit.

3. The control circuit of claim 1, wherein a fan deactivation control circuit is electrically connected to the watchdog circuit.

4. The control circuit of claim 1, wherein the first monitoring circuit comprises at least one resistor and an N-Channel FET.

5. The control circuit of claim 1, further comprising a second monitoring circuit that comprises at least one resistor and an N-Channel FET.

6. The control circuit of claim 1, wherein the watchdog circuit is held in reset by a pulsed input, and an output of the watchdog circuit controls the relay.

7. The control circuit of claim 1, wherein a capacitor communicates a signal to a gate of an N-Channel FET of the rising edge detector.

8. The control circuit of claim 7, wherein the capacitor at the output of the rising edge detector is charged through a resistor when a voltage is not pulled below a predetermined threshold to signal the watchdog timer to reset.

9. The control circuit of claim 1, wherein a backup power supply of the power loss activation circuit is activated when a main power supply is below a predetermined threshold.

10. The control circuit of claim 1, wherein a desired function is either enforced or prevented in the event of a power loss.

11. The control circuit of claim 10, wherein the desired function includes turning on a fan and turning off a compressor.

12. A method of driving a relay, comprising:
monitoring an operation of a control circuit, wherein a microcontrol unit (MCU) communicates directly with a watchdog circuit, wherein, under a normal operation, the MCU operates to constantly reinforce a state of the relay; and
activating the watchdog circuit in the event that communication of the MCU with the watchdog circuit ceases, wherein the watchdog circuit is configured to activate a first coil terminal of the relay by way of a first relay control circuit to control operation of a relay;
wherein a first relay control circuit is comprised of a first node coupled to the first coil terminal, wherein the first relay control circuit is configured to energize the first coil terminal in the event of a power loss;
wherein the watchdog circuit includes a rising edge detector and a watchdog timer, and an inputted signal passes through the rising edge detector to the watchdog timer during normal operation; and
wherein the watchdog circuit further includes a falling edge detector and a pulse generator, the watchdog timer outputs a periodic signal to the falling edge detector which enables the pulse generator, at which point the signal is outputted to the first relay control circuit maintaining the relay in the failsafe state.

13. The method of claim 12, further comprising maintaining the relay in a failsafe state using a pulse generator having a first node configured to energize the first coil terminal and a second node configured to energize a second coil terminal of the relay during normal operation of the control circuit.

14. The method of claim 12, wherein disablement of the first coil terminal by way of the first relay control circuit is associated with the failsafe state of a system coupled to the relay.

15. The method of claim 14, wherein maintenance of the relay in a normal state by means of a second relay control circuit is associated with a normal running state of the system coupled to the relay.

* * * * *